Feb. 2, 1971  G. HORHOTA  3,560,130

LOCK CORE SERVICE VALVE

Filed Jan. 15, 1968  3 Sheets-Sheet 1

INVENTOR
GEORGE HORHOTA
BY
Nolte & Nolte
ATTORNEYS

Feb. 2, 1971  G. HORHOTA  3,560,130
LOCK CORE SERVICE VALVE
Filed Jan. 15, 1968  3 Sheets-Sheet 2
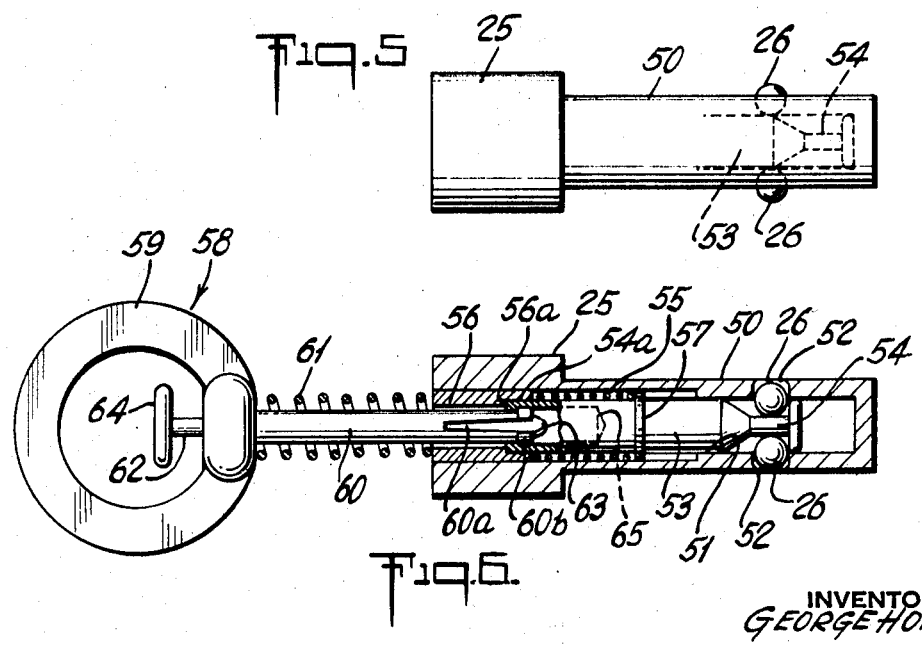
INVENTOR
GEORGE HORHOTA
BY
Nolte & Nolte
ATTORNEYS

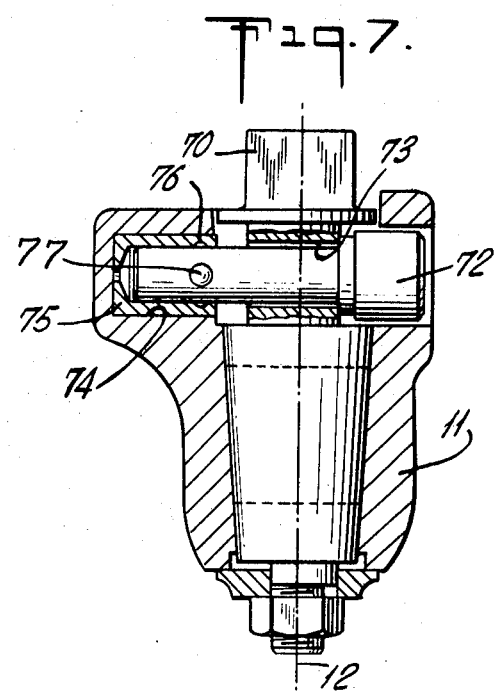

United States Patent Office 3,560,130
Patented Feb. 2, 1971

3,560,130
LOCK CORE SERVICE VALVE
George Horhota, 713 Stanley Terrace,
Roselle, N.J. 07203
Continuation-in-part of application Ser. No. 658,855,
Aug. 7, 1967. This application Jan. 15, 1968, Ser.
No. 704,501
Int. Cl. F16k 35/06
U.S. Cl. 251—111                                4 Claims

ABSTRACT OF THE DISCLOSURE

A valve having a housing and a valve core or member is disclosed which can be locked by a locking pin, especially a Smith-Morse pin. The locking pin passes through the valve core and presents rotation of the core relative to the housing in one position and allows rotation thereof in another position.

---

This application is a continuation-in-part of Serial No. 658,855 filed Aug. 7, 1967, now abandoned.

BACKGROUND OF THE INVENTION (A) Field of the invention

The present invention relates to a lock core service valve. More particularly, the invention relates to apparatus for selectively locking and unlocking a gas valve in position.

(B) Description of the prior art

A great number of gas valve locking devices have been developed since the early days of gas distribution via pipe systems. These devices are, for the most part, complex and complicated, and the more complex a device, the more likely it is to fail in operation. Those of the devices which are not as complex as the others are readily and facilely tampered with, so that they have little practical value.

SUMMARY OF THE INVENTION

The principal object of the present invention is to provide new and improved apparatus for selectively locking and unlocking a gas valve in position. The gas valve locking apparatus of the present invention is of very simple structure and is sturdy and reliable in operation. It is not easy to tamper with since the locking portion is internally concealed.

In accordance with the present invention, apparatus for selectively locking and unlocking a gas valve in position functions with a valve comprising a valve housing having an axis extending substantially perpendicularly to the axis of a gas line in which the valve housing is provided. A valve member is coaxially rotatably mounted in the valve housing for rotation about its axis in a manner wherein the valve member blocks the flow of gas in the gas line through the valve housing in determined axial positions thereof and permits the flow of gas in the gas line through the valve housing in other determined axial positions thereof. The apparatus of the present invention comprises locking means on the valve member and the valve housing adapted to cooperate with each other when the valve member is in a determined position to prevent movement of the valve member.

The locking means may comprise a bore formed through the valve member and extending substantially perpendicularly to the axis of the valve member. A bore is formed in the valve housing extending through the valve housing at one diametrical point relative to the valve member and extending into the valve housing from the inside thereof at the opposite diametrical point and axially aligned with the bore through the valve member when the valve member is in the determined position. The bores are adapted to receive a locking pin when the valve member is in the determined position.

In another embodiment of the invention, the valve includes a valve housing having an axis extending substantially perpendicularly to the axis of the gas line in which the valve housing is provided. The apparatus comprises a valve member coaxially rotatably mounted in the valve housing for rotation about its axis in a manner wherein the valve member blocks the flow of gas in the gas line through the valve housing in determined axial positions thereof and permits the flow of gas in the gas line through the valve housing in other determined axial positions thereof. The valve member has an axial bore formed therein and radially extending notches formed in the valve member and opening in the axial bore thereof at determined points thereof. Key-operated locking means coaxially positioned in the bore in the valve member includes a locking pin and key-controlled retractable locking members. The key-controlled retractable locking members are retracted into the locking pin in one position of the locking means so that the locking pin becomes freely rotatable about its axis and may be removed from the valve member to unlock the valve. In another position of the locking means, the locking members extend rigidly from said locking pin and pass into the radially extending notches of the valve member whereby the locking pin is coupled to the valve member and the valve member locked to the valve housing.

BRIEF DESCRIPTION OF THE DRAWING

In order that the present invention may be readily carried into effect, it will now be described with reference to the accompanying drawing, wherein:

FIGS. 5 and 6 show the locking pin of the embodiment of FIGS. 1 and 4 in detail; FIG. 6 also showing the key for operating the locking pins of FIGS. 1 to 4.

FIG. 7 shows a section through a further embodiment of the present invention.

DESCRIPTION OF THE PREFERRED EMBODIMENTS

Figure 1:
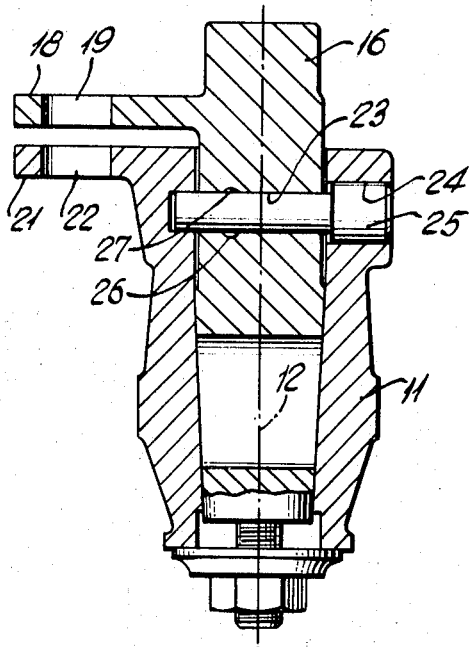
FIG. 1 is a sectional view, in a plane parallel to the cross-section of the gas line, of an embodiment of the apparatus of the present invention.

In the figures, the same components are identified by the same reference numerals.

The valve of each of the embodiments of the invention comprises a valve housing 11 having an axis 12 extending perpendicularly to the axis 13 (FIG. 2) of a gas line 14 in which the valve is provided. A valve member 16 in FIG. 1, 15 in FIG. 4, and 70 in FIG. 7, is coaxially rotatably mounted in the valve housing 11 for rotation about its axis 12.

The valve member 15, 16, 17 or 70 blocks the flow of gas in the gas line 14 (FIG. 2) through the valve housing 11 in determined first positions of said valve member and permits the flow of gas in the gas line 14 through the valve housing 11 in determined second positions of said valve member. Thus, for example, in one position of the valve member the valve is closed. When the valve member is rotated 90 degrees about its axis, it may then open the valve. When the valve member is rotated 180 degrees about its axis from its initial position, it way then close the valve. When the valve member is rotated 270 degrees about its axis from its initial position, it may then open the valve.

Figure 2:
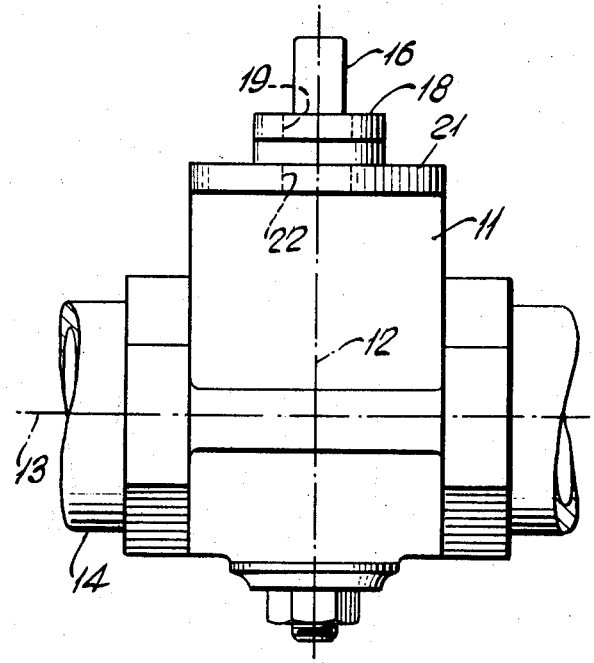
FIG. 2 is a side view of the apparatus of FIG. 1.
Figure 4:
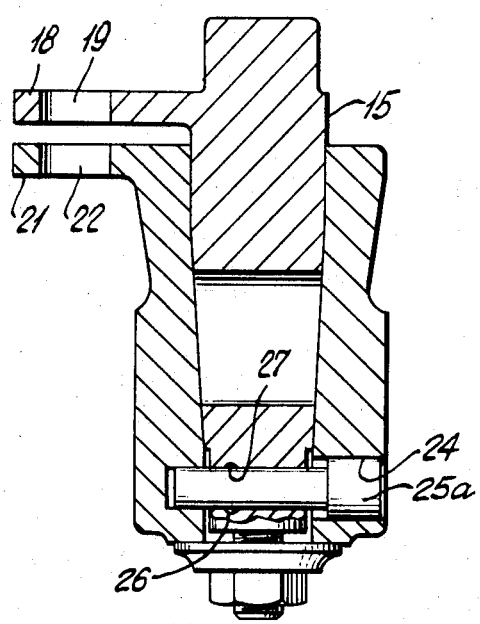
FIG. 4 is a sectional view similar to that of FIG. 1 of a slightly modified embodiment of the invention.
Figure 3:
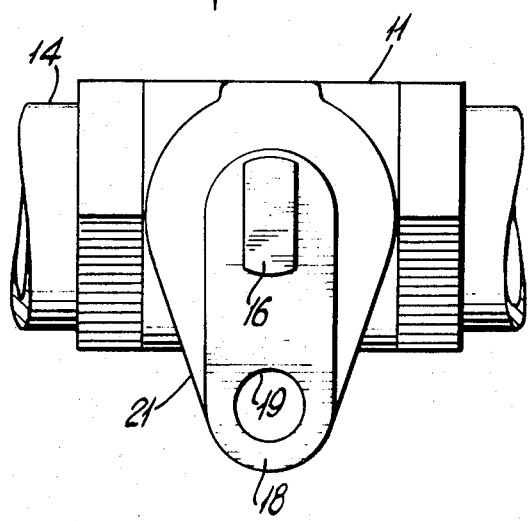
FIG. 3 is a top view of the apparatus of FIG. 1.

In the embodiments of FIGS. 1 and 4 a valve arm 18 may extend from the valve member 15 or 16 respectively, outside the valve housing 11 in a direction substantially perpendicularly to the valve member. The valve arm 18 rotates about the axis 12 of the valve member 15 or 16, with the valve member. A bore 19 is formed through the valve arm 18.

An arm 21 extends from the valve housing 11. A bore 22 is formed through the arm 21. The bores 19 and 22 are axially aligned with each other when the valve arm 18 is in a determined position. The determined position is, of course, dependent upon whether it is desired to lock the valve in open or in closed condition. The bores 19 and 22 are adapted to receive a lock when the valve arm 18 is in its determined position in axial alignment of the bores 19 and 22. Any suitable lock or locking device such as, for example, a padlock, may be utilized as the locking device.

When the locking rod or locking device (not shown) is passed through the bores 19 and 22 and is locked, the valve member 15 or 16 is prevented from rotating about its axis, which is the axis 12 of the valve housing 11.

The above described customary locking device is not tamper-proof. Therefore, in conformity with the present invention, a special locking apparatus has been provided. In the embodiment of FIG. 1, the locking apparatus comprises a bore 23 formed through the valve member 16. The bore 23 extends substantially perpendicularly to the axis 12 of the valve member 16. A bore 24 is formed in the valve housing 11. The bore 24 extends through the valve housing 11 at one diametrical point relative to the valve member 16 and extends into said valve housing from the inside thereof at the opposite diametrical point. The bore 24 in the valve housing 11 and the bore 23 through the valve member 16 are axially aligned with each other when said valve member is in the determined first or locking position.

The bores 23 and 24 are adapted to receive a locking pin 25 when the valve member 16 is in the determined first position. Any suitable locking pin or locking device such as, for example, a so-called Smith-Morse pin, well known in the art, may be utilized as the locking device or locking pin 25. The Smith-Morse pin 25 has key-controlled retractable members 26 such as, for example, steel balls, which are retracted into said pin in a first condition of said pin under the control of a key or control member. In this first condition of the pin 25 the unlocked condition, said pin is freely rotatable about its axis and is freely movable in directions along its axis.

A plurtlity of radially extending notches 27 are formed in the valve member 16 and open in the axial bore 23 of said valve member. In another second condition of the Smith-Morse pin 25, the retractable members 26 are rigidly extended from said pin. In this second condition of the pin 25, the members 26 of said pin pass into corresponding ones of the radially extending notches 27 of the valve member 16. The pin 25 is thus locked in position, and cannot rotate about its axis or more in directions along its axis. The valve member 16 thus remains stationary in the determined axial position of said valve member, since the pin 25 prevents said valve member from rotating about its axis 12. The pin is locked in position and cannot be removed from the aligned bores 23 and 24 without the use of the key or control member.

The combination apparatus of FIG. 1 provides the double security of utilizing both the outer locking device and the special interior locking device 25. In the usual situation, even if an outer locking device in bores 19, 20 proves to be vulnerable to tampering, the locking device 25 prevents the valve from being opened by unauthorized persons. Only the use of the proper key makes it possible to open the valve.

The embodiment of FIG. 4 differs from that of FIG. 1 only in that the locking pin 25a is arranged in the bottom portion of the valve housing and valve member instead of in the top portion.

FIGS. 5 and 6 illustrate the structure of the locking pin 25 in greater detail. The pin comprises a sleeve 50 provided with a longitudinal stepped bore 51 and a plurality of radial recesses 52 for receiving the members 26. A plunger 53 with a reduced diameter portion 54 and a sleeve portion 54a is slidably mounted in sleeve 50. A spring 55 held between an insert 56 in sleeve 50 and a flange 57 of plunger 53 normally urges the plunger 53 into a position in which the plunger 53 displaces the ball members 26 toward the outside to protrude beyond the outer diameter of sleeve 50, as shown in FIG. 5. In this position, the ball members 26 engage in the notches 27 of the valve member 15 or 16 respectively.

A key 58 may be inserted into pin 25 for withdrawing the ball members 26 from the notches 27. Key 58 comprises a handle 59, a sleeve 60 split at 60a and connected to handle 58, a spring 61 likewise connected to handle 58 and a pin 62. Pin 62 is passed through sleeve 60 and has an enlarged head 63 at one end and a small disc 64 tt the other end. Sleeve 60 has an enlarged diameter portion 60b.

When key 58 is inserted into pin 25, sleeve 60 with pin 62 slides through insert 56 and the sleeve portion 54a of plunger 53. After the key has been pushed in a certain distance against the force of spring 61, head 63 will engage an abutment 65 of plunger 53 and portion 60b of sleeve 60 is caught in the sleeve portion 54a of plunger 53. Upon release of key handle 58, spring 61 will return the key until portion 54a engages an abutment 56a of insert 56. In this way, plunger 53 has been moved to the left, in FIG. 6, sufficiently to bring the reduced diameter portion 54 in register with the recesses 52 of sleeve 50 to receive the ball members 26. The pin together with the key can now be removed from the valve member 15 or 16, respectively. In order to separate key 58 from the pin in the position shown in FIG. 6, disc 64 is depressed whereupon head 63 will disengage from split sleeve portion 60a so that the latter will reduce its diameter and disengage from sleeve portion 54a. Thus sleeve 60 can be withdrawn from the plunger 53 and insert 56.

If the valve is to be locked, pin 25 with key 58 in the relative position shown in FIG. 6 is introduced into valve housing 11 and valve member 16 when the bores 23 and 24 are in alignment. Upon registry of bores 52 and notches 27, the key is withdrawn, as described above, whereupon ball members 26 will enter the notches 27 upon displacement by plunger 53 due to the action of spring 55.

The embodiment shown in FIG. 7 differs from that of FIGS. 1 and 4 primarily in that the locking device 72 extends through a bore 73 in valve member 70 while a recess 74 in housing 11 receives a cap 75 provided with radially extending notches 76 for receiving the retractable balls 77 of the locking device. In this way, it is not necessary to provide the notches for the retractable balls in the relatively soft or brittle material of the valve member proper but in the cap 75 of relatively hard material. It is obvious that the reduced section in the core member weakens the stem.

It must be understood that bore 73 need not be of different material than core 70. For larger dimensional valves cap 75 could terminate in core 70 at an appropriate position to effect locking of bearings or other device 76. It would not be necessary for locking pin 72 to go completely through the core 70.

What is claimed is:

1. Apparatus for selectively locking and unlocking a valve, said valve comprising a housing member having an axis extending substantially perpendicularly to the axis of a line in which said valve is provided, a valve core member coaxially rotatably mounted in said housing member for rotation between a first position wherein said valve core member blocks the flow in said line through said housing member and a second position wherein flow is permitted through said housing member, said valve core member having a bore passing therethrough and said housing member having a blind bore therein, said housing member and valve core member bores being coaxial when said valve core member is in said first position, at least one radially extending notch formed in one of said members and key operated locking means coaxially positioned in said bores and including a locking pin and key controlled locking members which radially rigidly extend outwardly from said locking pin into said notch when said locking means is in a first condition and which are retracted within said locking pin when said locking means is in a second condition, whereby said valve core member's rotational position can be maintained and locked at said first valve core member position by said locking means, said valve core member including a valve control member for rotating the valve core member, the width of said valve control member being greater than the width of at least a portion of said valve core member intermediate said valve control member and said valve core member bore, whereby when said valve is locked in said first position and an attempt is made to break the locking means by forcing the rotation of said valve core member, said valve control member will shear off leaving the locking structure in fail safe condition.

2. Apparatus as claimed in claim 1, comprising a valve arm extending from said valve member outside said valve housing in a direction substantially perpendicular to said valve member and rotating about the valve member axis with said valve member, a bore formed through said valve arm, an arm extending from said valve housing having a bore formed therethrough and axially aligned with the bore through said valve arm when said valve arm is in said determined position, said bores being adapted to receive a lock when said valve arm is in said determined position.

3. An apparatus according to claim 1, wherein said notches are provided in said valve member.

4. Apparatus according to claim 1, wherein said locking means includes a head portion, said head portion having an outer diameter substantially larger than said core member bore diameter and said valve further includes a lock receiving cap positioned within said blind bore, said notch being formed in said cap and said cap having an outer diameter substantially larger than the diameter of said valve core member bore, the diameter of said valve core member bore substantially exceeds the diameter of said locking means within said bore and said locking means, when in said second condition within said valve, is substantially flush with the outer surface of said housing member.

References Cited

UNITED STATES PATENTS

| | | | |
|---|---|---|---|
| 359,714 | 3/1887 | Deming | 70—176 |
| 1,231,164 | 6/1917 | Jahns et al. | 70—179UX |
| 1,325,189 | 12/1919 | Carter | 70—176 |
| 2,058,951 | 10/1936 | Buirk | 251—111X |
| 3,002,368 | 10/1961 | Moberg | 85—5X |
| 3,450,148 | 6/1969 | Mongelluzzo et al. | 137—382X |

FOREIGN PATENTS

| | | | |
|---|---|---|---|
| 906,832 | 9/1962 | Great Britain | 85—5 |

HENRY T. KUNKSIEK, Primary Examiner

U.S. Cl. X.R.

137—385